United States Patent [19]
Wallenfang et al.

[11] 3,829,030
[45] Aug. 13, 1974

[54] CAM PLATE ADJUSTMENT FOR RECUTTER SCREEN OF FORAGE HARVESTER

[75] Inventors: Jerome A. Wallenfang; Wilmer E. Witt, both of Appleton, Wis.

[73] Assignee: Koehring Company, Milwaukee, Wis.

[22] Filed: Jan. 30, 1973

[21] Appl. No.: 328,068

[52] U.S. Cl. .............................. 241/89.1, 241/73
[51] Int. Cl. ..................................... B02c 13/282
[58] Field of Search ............ 241/89.2, 83, 86, 86.1, 241/86.2, 273.4, 73, 74, 294, 301

[56] References Cited
UNITED STATES PATENTS

| | | | |
|---|---|---|---|
| 1,889,183 | 11/1932 | Rosenfeld | 241/86 X |
| 2,317,909 | 4/1943 | Gruendler | 241/88.4 |
| 3,389,732 | 6/1968 | Waldrop | 241/301 |

Primary Examiner—Roy Lake
Assistant Examiner—E. F. Desmond
Attorney, Agent, or Firm—Andrew J. Beck

[57] ABSTRACT

A forage cutter includes a housing having a pair of end walls, rotary cylinder shaft journaled for rotation in the end walls, a rotary cutter mounted on the shaft and having a plurality of cutting knives, a shapeable recutter screen positioned in coacting shearing relation with the cutting knives, and rotatable cam means engaged with the recutter screen. The cam means has a curved abutment edge of decreasing radius about its circumference for positioning and controlling the radius of the recutter screen.

11 Claims, 6 Drawing Figures

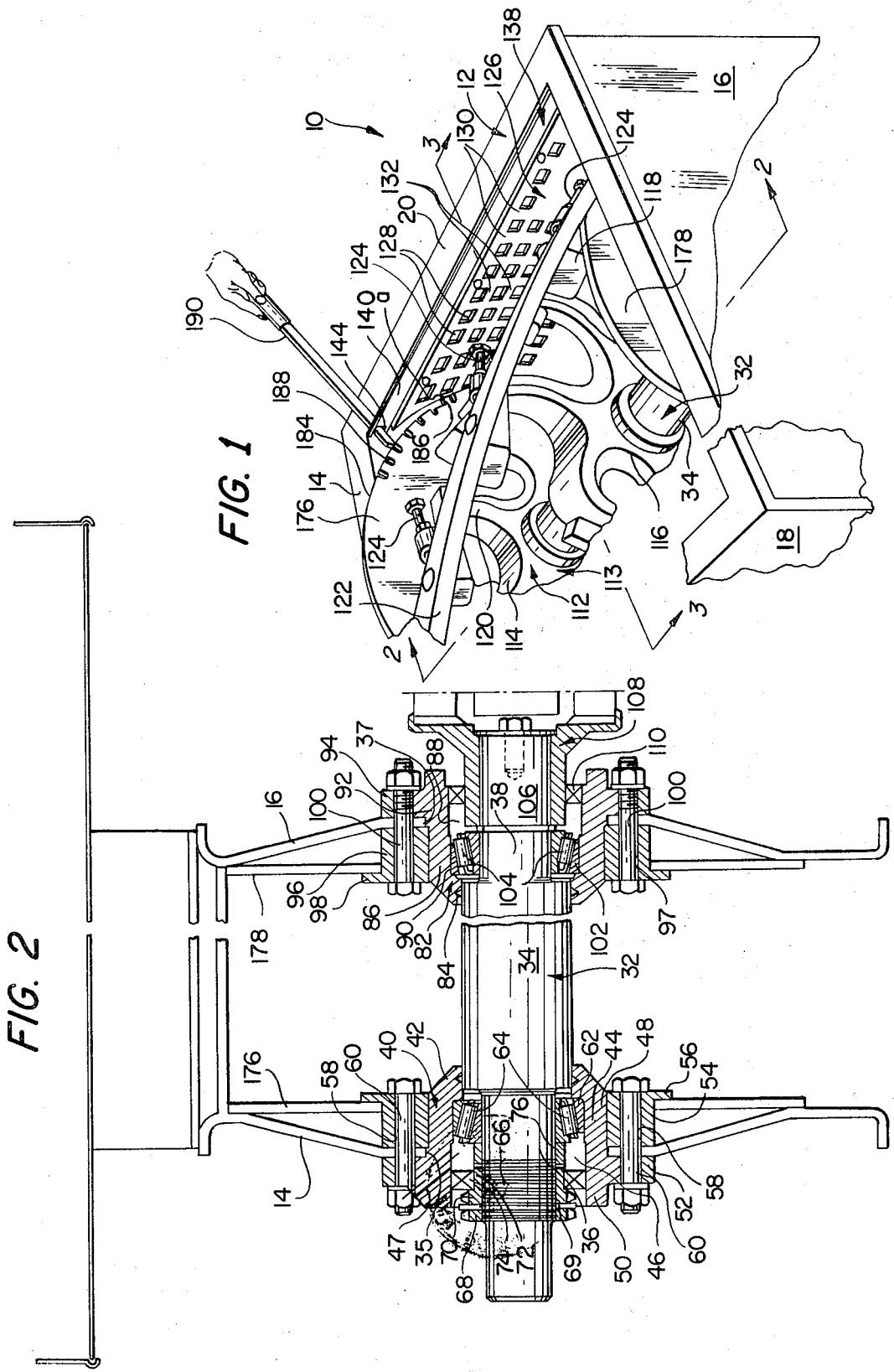

CAM PLATE ADJUSTMENT FOR RECUTTER SCREEN OF FORAGE HARVESTER

This invention relates to forage harvesters having a cutting unit that includes a recutter screen which coacts with the rotatable cylindrical cutter of the cutting unit, and more particularly to improvements in the means for positioning the recutter screen with respect to the rotatable cylindrical cutter.

BACKGROUND OF THE INVENTION

One component of forage harvesters is a forage cutting cylinder which receives crop material, such as various types of hay and cereal grasses, whole corn plant, or ear corn, cuts it into small pieces and discharges the pieces, usually into a trailing wagon or truck. In the past, forage cutting units have had two major functions; (1) to cut crop material and (2) to propel the material with sufficient velocity to carry the material to the trailed wagon or truck.

The cutting units generally comprise a horizontally disposed housing having a front inlet and rear or side directed discharge outlet. A stationary shear bar is mounted at the lower edge of the inlet. A cylindrical cutter having knives mounted on a cutterhead is rotatable within the housing. The knives move downwardly past the shear bar and then rearwardly toward the discharge outlet.

In the past, the propulsion of the material through the discharge outlet has come partly from the centrifugal throwing action of the knives and partly from the air current generated by the fast moving knives and cutterhead. This function of the cutter in propelling the cut material rearwardly has been largely replaced by use of an independent blower to propel the cut material. Forage harvesters employing an independent blower have the advantage that a stationary recutter screen that coacts with the rotating knives of the cylindrical cutter can be placed at the discharge side of the cutting unit to provide uniform and complete cutting of the crop material. The recutter screen is fitted close to the rotary knives and has bars to retard the flow of material to the discharge outlet, and thus causes the material to be recut.

For proper operation and maximum efficiency of the cutting unit, proper operating clearance between the cooperating cutting parts must be maintained. Thus, there must be proper clearance between the rotary knives of the cylindrical cutter and the fixed shear bar and there must be proper clearance between the rotary knives and the recutter screen. While proper clearance is established in these areas when the unit is initially assembled, wear and sharpening of the rotary knives during normal use and wear of the recutter screen changes these clearances. On most forage cuteers, the rotary knives of the cylindrical cutter are radially adjustable on the cutterhead so that as they wear, or as they are sharpened, they may be moved outwardly to reestablish proper clearance with respect to the recutter screen. This is a tedious time consuming operation which may have to be performed during the cutting season and represents undesirable down time when the machine may be urgently needed to harvest crops at their peak feed value.

Alternatively, proper clearance between the recutter screen and rotary knives of the cylindrical cutter can be obtained by repositioning the recutter screen. One type of mounting for a recutter screen is illustrated in U.S. Pat. No. 3,566,943 to Witt, issued Mar. 2, 1971 where the recutter screen is mounted adjacent and abuts against the arcuate abutment edges of a pair of crescent segments which are secured to the end walls of the cutter housing. The recutter screen disclosed in Witt has two sets of cutting edges, but only one set at a time coacts with the rotary cutter knives. When this set becomes dull, the recutter screen can be reversed to bring the other set into operative position.

Although the recutter screen of Witt can be reversed to bring a new set of its cutting edges into play, the reversal does not overcome the problem caused by the wear or sharpening of the rotary knives and does not permit fine adjustment of the recutter screen. The arcuate abutment edge of each crescent segment of the Witt cutter has a constant radius throughout and it is therefore necessary to replace each segment with a segment of lesser radius when it is required to reposition the recutter screen and reduce its radius to compensate for wear and sharpening of the rotary cutting knives. The substitution of crescent segments is time consuming and requires a considerable expenditure of effort.

SUMMARY OF THE INVENTION

The present invention overcomes the problems of maintaining proper cutting relation between the recutter screen and rotary cutting knives caused by wear and sharpening of the cutting knives. The present invention provides a mechanism for repositioning the recutter screen and reducing its radius to compensate for wear and sharpening of the rotary cutting knives without necessitating lengthy and time consuming disassembly and assembly procedures.

Briefly, the present invention comprises a forage cutter including a housing, a rotary cylinder shaft mounted for rotation in the housing, a rotary cylindrical cutter mounted on the shaft and having a plurality of cutting knives, a shapeable recutter screen positioned in coacting shearing relation with the cutting knives, and rotatable cam means engaged with the recutter screen and having a curved abutment edge of decreasing radius about its circumference for positioning and controlling the radius of the recutter screen.

Preferably, the cam means comprises a pair of annular disks mounted about the shaft. It is also preferred that the cam means be movable from a first position where a first segment of its abutment edge is engaged with the recutter screen to a second position where a second segment of its abutment edge having a different effective radius than the first segment is engageable with the recutter screen. The forage cutter preferably includes adjusting means for adjusting the recutter screen from its engagement with the first segment of the abutment edge to engagement with the second segment to vary the effective radius of the recutter screen and bring it into proper cutting relation with the cutting knives.

It is further preferred to provide coupling means on each annular disk for engagement with a tool which operates to rotate the disks from the first position to the second position. Desirably, the coupling means is a plurality of notches on the outer periphery of the annular disks. It is also preferred that the recutter screen has secured to it a retainer bar which has access means for permitting a tool to engage the coupling means.

It is to be understood that both the foregoing general description and the following detailed description are exemplary and explanatory but are not restrictive of the invention.

The accompanying drawings illustrate examples of preferred embodiments of the invention and together with this description serve to explain the principles of the invention. The same reference numerals in the figures indicate like parts.

Of the Drawings:

FIG. 1 is a fragmentary perspective view of a forage cutter constructed in accordance with the teachings of the present invention.

FIG. 2 is a vertical sectional view taken along line 2—2 of FIG. 1, with the blades of the rotary cylindrical cutter removed for purposes of clarity.

DETAILED DESCRIPTION OF THE INVENTION

Figure 3:
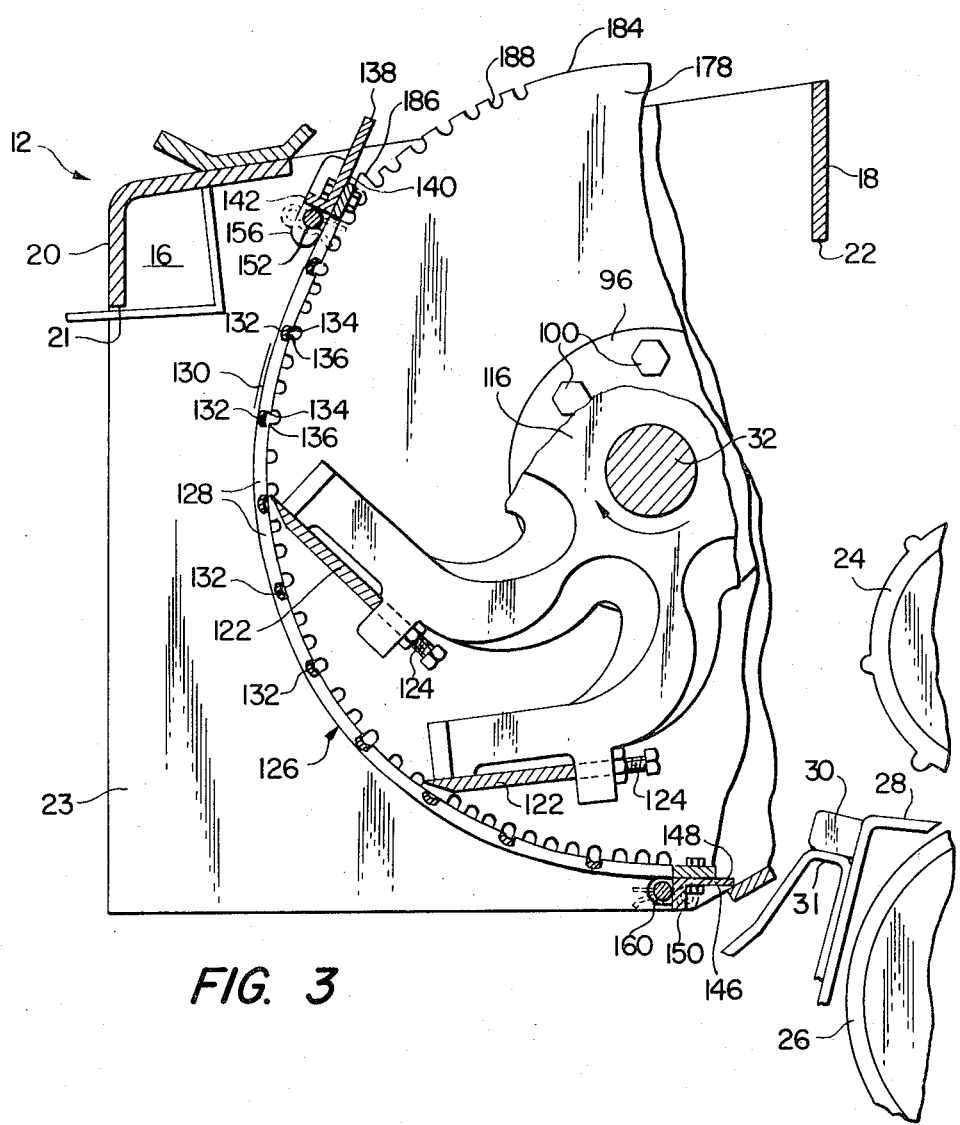
FIG. 3 is a fragmentary vertical sectional view taken along line 3—3 of FIG. 1 showing a recutter screen installed in operative position.

Referring to FIG. 1, the present invention is embodied in a forage harvester having a forage cutter, generally 10. Forage cutter 10 includes a housing, generally 12, having first and second opposing end walls 14 and 16, respectively, a front wall 18 and a back wall 20. As best seen in FIG. 3, back wall 20 extends along the upper portion of housing 12 and is at the discharge side of the forage cutter. Back wall 20 terminates at 21 to provide an outlet opening 23 through which cut material may be discharged. Front wall 18 has an inlet 22 and horizontal upper and lower feed rolls 24 and 26 respectively, are disposed forwardly of inlet 22. Upper feed roll 24 is spring mounted in a conventional manner to permit it to move up and down to accomodate variations in the thickness of the entering forage material. An infeed platform and cleaning bar 28 for lower feed roll 26 defines the lower limit of inlet 22 and extends rearwardly from lower feed roll 26 to a stationary shear bar 30. Shear bar 30 can be fixed or adjustable and is supported by a cross member 31 secured to 14 and 16 end walls.

As best seen in FIG. 2, a rotary cylinder shaft, generally 32 is suitably journaled for rotation in end walls 14 and 16. Cylinder shaft 32 comprises an enlarged center section 34, a first reduced end section 36 that passes through a central opening 35 in end wall 14, and a second reduced end section 38 that passes through an opening 37 in end wall 16. Reduced end sections 36 and 38 are journaled for rotation in end walls 14 and 16 by similar supporting structures.

The supporting structure for reduced end section 36 includes an annular hub, generally 40, secured to end wall 14. Hub 40 has an inner end 42 that abuts against the outer end of center section 34 of cylinder shaft 32 adjacent end wall 14 and an annular sleeve 44 that axially extends from inner end 42. Sleeve 44 passes through opening 35 in end wall 14 and overlies and is spaced from reduced end section 36 to form an annular lubrication recess 46 therewith. An oblique opening 47 extends through sleeve 44 for providing lubrication in recess 46. Sleeve 44 comprises an inner segment 48 that is within housing 12 and an outer segment 50 outside of end wall 14. A collar 52 extends radially upwardly from outer segment 50 of the sleeve and abuts against the outside of end wall 14.

A support cylinder 54 is mounted directly about inner segment 48 and has a radially extending flange 56 at its inner end. Cylinder 54 has a plurality of axially extending bores 58 that are aligned with an equal number of axially extending bores in collar 52 of hub 40 and an equal number of bores in end wall 14. A threaded bolt 60 is provided for each set of axially aligned bores for securing cylinder 54 and hub 40 to end wall 14.

A tapered roller bearing cup 62 is positioned within inner segment 48 of sleeve 44 and a tapered roller bearing 64 is mounted between this cup and reduced end section 36 of cylinder shaft 32. Reduced end section 36 is further provided with a threaded segment 66 that extends outwardly past end wall 14. A pair of hexagon nuts 68 and 70, separated by a bearing lock washer 69, are threadably secured to threaded segment 66 to provide adjustment for and position tapered roller bearing 64 and a tapered roller bearing 104 cooperating with reduced end section 38. The inner nut 70 has an axially extending hub 72, on which a seal 74 rides to effectively seal lubrication recess 46. An annular spacer 76 is positioned about reduced end section 36 between tapered roller bearing 64 and hexagon nut 70 to define lubrication recess 46.

The supporting structure for reduced end section 38 is substantially identical to that just described for reduced end section 36 and includes an annular hub, generally 82, secured to end wall 16. Hub 82 has an inner end 84 that abuts against the outer end of center section 34 of cylinder shaft 32 adjacent end wall 16 and an annular sleeve 86 that axially extends from its inner end 84. Sleeve 86 passes through opening 37 in end wall 16 and overlies and is spaced from reduced end section 38 to form an annular lubrication recess 88 therewith. Sleeve 86 comprises an inner segment 90 and an outer segment 92. A collar 94 extends radially upwardly from outer segment 92 and abuts against the outside of end wall 16.

A support cylinder 96 is mounted directly about inner segment 90 and has a radially extending flange 98 at its inner end. Cylinder 96 has a plurality of axially extending bores 97 that are aligned with an equal number of axially extending bores in collar 94 and an equal number of bores in end wall 16. A threaded bolt 100 is provided for each set of axially aligned bores for securing cylinder 96 and hub 82 to end wall 16.

A tapered roller bearing cup 102 is positioned within inner segment 90 of sleeve 86 and tapered roller bearing 104 is mounted between this cup and reduced end section 38. Reduced end section 38 has a splined segment 106 and a universal joint yoke generally 108, is mounted on this segment. A seal 110 is mounted between yoke 108 and outer segment 92 of sleeve 86. Yoke 108 is connected through a universal joint assembly to the main drive shaft (not shown) for driving the forage cutter.

As best seen in FIG. 1, a rotary cutter, generally 112, is mounted on enlarged center section 34 of cylinder shaft 32. Cutter 112 includes a cutterhead, generally 113, comprised of a first knife support 114 secured to cylinder shaft 32 adjacent end wall 14, a center knife support 116 secured to the center of cylinder shaft 32, and a third knife support 118 secured to the cylinder shaft adjacent end wall 16. Knife support 114 has a plurality of radially extending arms 120 which are aligned with an equal number of similar arms on knife supports 116 and 118. A cutting knife 122 is secured to each set of aligned arms and set screws 124 mounted on each knife support 114, 116, and 118 permit individual and precise adjustment of knives 122. As seen in FIG. 3, knives 122 coact in cutting relationship with shear bar 30 mounted at inlet 22.

Figure 4:
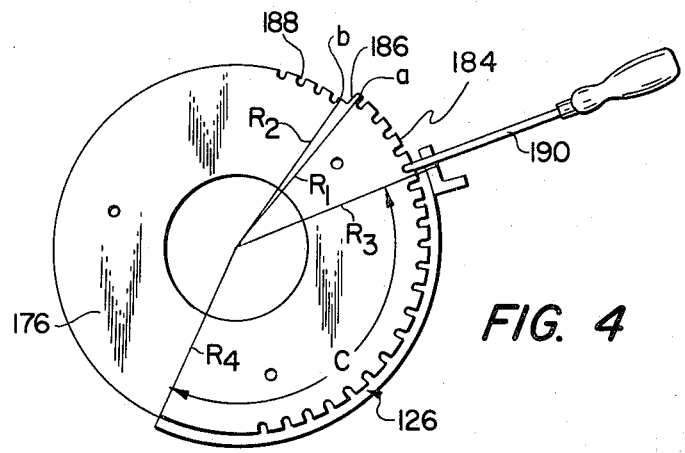
FIG. 4 is an end view of an annular disk and recutter screen assembly constructed in accordance with the teachings of this invention, and shows a tool in operative position for rotating the disk.

In accordance with the invention, a shapeable recutter screen is positioned in coacting relation with the cutting knives. As here embodied, and as shown in FIGS. 1, 3 and 4, a recutter screen generally 126, is formed of a shapeable sheet material which is ductile and capable of being molded. A major portion of recutter screen 126 is curved in a substantially true arc concentric with the axis of cylinder shaft 32. The radius of curvature of recutter screen 126 is usually about 8 to 14 inches for use in forage harvesters, and preferably is only about 8 inches. Screen 126 is provided with a plurality of rectangular openings 128 separated by transversely extending bars 130 and by axially extending bars 132. For one typical type of usage, openings 128 are 1 ½ inches square, but they may be smaller or as large as 6 inches square depending upon the material being cut.

Recutter screen 126 is preferably formed by stamping and punching sheet metal in a manner to cause the metal of openings 128 to be punched out and removed, and to cause simultaneous inward bending or offsetting of the upper and lower edges 134 and 136 of each of the axially extending bars 132 to provide fixed shearing blades as shown in FIG. 3. The offsetting is preferably performed so that edges 134 and 136 are on a one-fourth inch radius, with the edges being offset inwardly one-sixteenth inch from recutter screen 126. After stamping, recutter screen 126 is heat treated along the bars 132 to harden the offset edges 134 and 136. A further description of recutter screens for use in the present is found in the above mentioned Witt patent which is hereby incorporated by reference.

As best seen in FIGS. 1 and 3, an upper angle bar retainer generally 138, is secured to the top edge of recutter screen 126. Angle bar retainer 138 is generally L-shaped and includes a connecting plate 140 bolted to recutter screen 126 and a transverse support plate 142 substantially perpendicular to connecting plate 140. Connecting plate 140 extends past the top edge of recutter screen 126 and as seen in FIG. 1, has access means in the form of an end opening 144 at its end adjacent end wall 14 and a second end opening (not shown) at its other end. A second angle bar retainer 146 similar to angle bar retainer 138 is secured to the lower edge of recutter screen 126. Angle bar retainer 146 has a connecting plate 148 that extends past the lower edge of recutter screen 126 and a transverse support plate 150.

Figure 6:
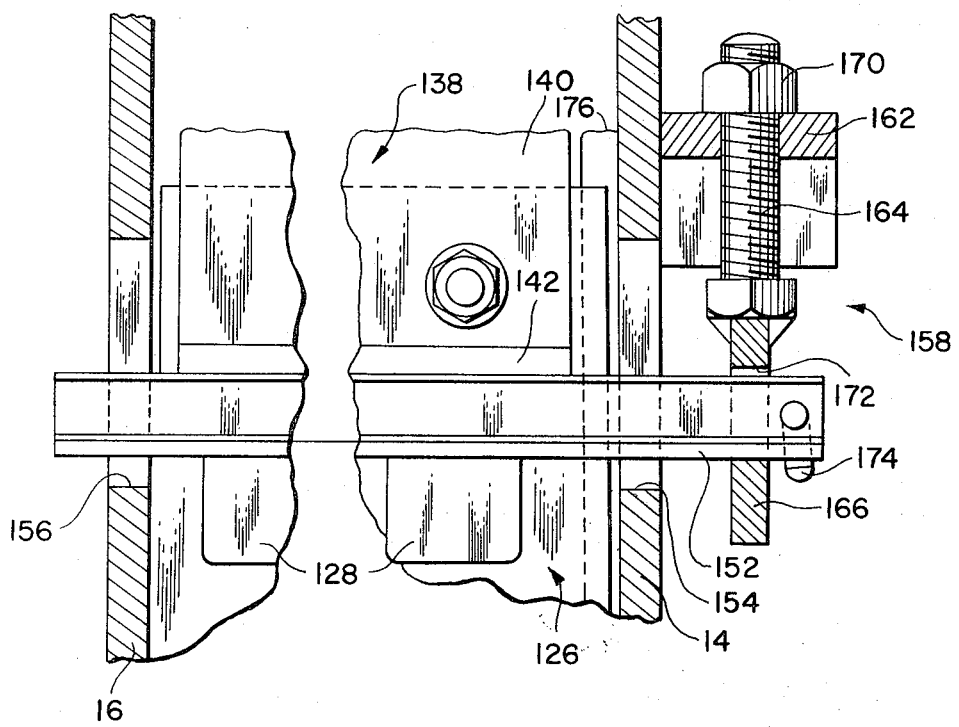
FIG. 6 is a fragmentary longitudinal sectional view through the mechanism of FIG. 5 and shows a portion of the recutter screen and an upper anchoring rod for supporting the screen.

Recutter screen 126 is mounted in housing 12 with its inner curved cutting surface adjacent the cutting path of cutter knives 122. As best seen in FIG. 3 and 6, an upper anchoring rod 152 extends through a pair of aligned elongated slotted openings 154 and 156 in end walls 14 and 16 respectively. Each end of anhcoring rod 152 projects through its corresponding end wall and is supported by identical support means, generally 158. Support plate 142 of angle bar retainer 138 rests on upper anchoring rod 152. A lower anchoring rod 160 coacts with support plate 150 of lower angle bar retainer 146 in a similar manner and extends through openings in end walls 14 and 16 that are sized to prevent movement of the rod. Lower rod 160 is removably held in position by pin clips which are passed through holes in the rod.

Figure 5:
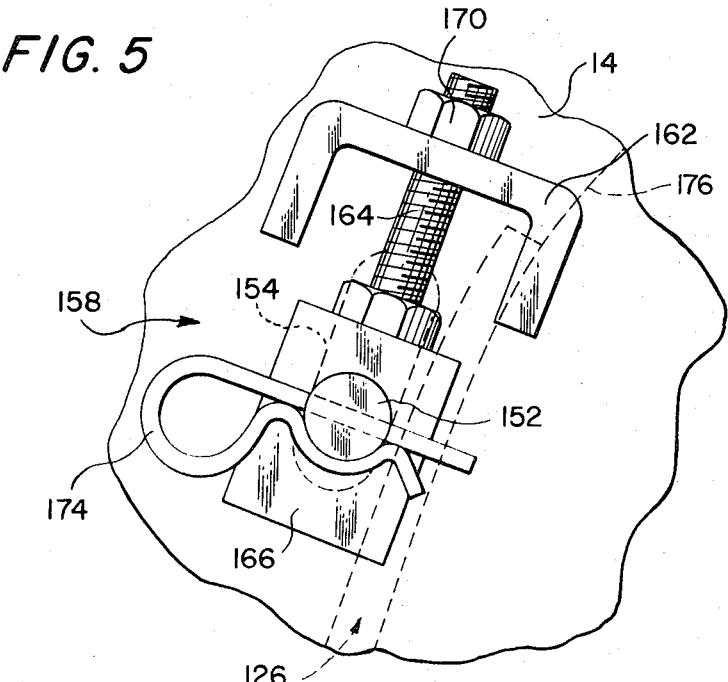
FIG. 5 is a fragmentary view looking at a portion of the end of the cutter housing, and shows the adjusting means for securing the recutter screen in a selected position.

The support means 158 for holding upper anchoring rod 152 in position will now be described with reference to end wall 14. Identical support means is also provided adjacent end wall 16, but this support means is not shown in the drawings. As shown in FIGS. 5 and 6 support means 158 comprises a U-bracket 162 suitably welded to end wall 14, an adjusting screw 164 extending through U-bracket 162, and a block 166 adjustably supported by adjusting screw 164. A nut 170 controls movement of adjusting screw 164. Block 166 contains an opening 172 and anchoring rod 152 passes through this opening. A pin clip 174 is passed through a hole in the projecting end of rod 152 to prevent axial movement thereof. The position of anchoring rod 152 in slotted opening 154 of end wall 14 can be varied by manipulating nut 170 so that adjusting screw 164 will pull up on block 166. As described in greater detail hereafter, support means 158 serves as an adjusting means for adjusting recutter screen 126.

In accordance with the invention, rotatable cam means engaged with the recutter screen and having a curved abutment edge of decreasing radius about its circumference is provided for positioning and controlling the radius of the recutter screen. As here embodied, and as seen in FIG. 1, this cam means comprises a first annular disk 176 mounted about cylinder shaft 32 adjacent end wall 14 and a second annular disk 178 mounted about cylinder shaft 32 adjacent end wall 16. As best seen in FIG. 2, annular disk 176 is mounted directly on cylinder 54 and is wedged between flange 56 of the cylinder at its inner periphery and end wall 14 at its outer periphery when bolts 60 are tightened.

Annular disk 178 is similarly mounted on cylinder 96 and is wedged between flange 98 and end wall 16. Annular disks 176 and 178 have a tight friction fit on cylinders 54 and 96 respectively, so that the disks will normally maintain the position they happen to be in, but they can be rotated about their respective cylinders upon application of a rotary force.

Annular disks 176 and 178 are identical and as best seen in FIGS. 1, 3 and 4, have an outer curved abutment edge 184 which has a decreasing radius about its entire circumference. As best seen in FIG. 4, the radius of abutment edge 184 decreases uniformly from a high point $a$ where it has a radius $R_1$ to a low point $b$ 360° away where it has a radius $R_2$. A step 186 is formed at the juncture of high point $a$ and low point $b$.

Annular disks 176 and 178 have coupling means in the form of a plurality of notches 188 at their outer periphery. A first series of notches 188 begins at high point $a$ of each disk and extends away from step 186 around the disk for about 132°. A second series of notches begins at low point $b$ of each disk and extends in the opposite direction around the disk for about 22°.

Notches 188 can be engaged by a tool 190 which can be inserted into the interior of housing 12 through end openings 144 in support plate 140 of angle retainer bar 138. Tool 190 can be inserted into a notch 188 and pivoted about back wall 20 to rotate disks 176 and 178 in either a clockwise or counterclockwise direction and bring the next adjacent notch into position for the next increment of rotation.

In operation, and when the cutting unit is initially assembled, recutter screen 126 is inserted into housing 12 from the top and then turned around with cylindrical cutter 112 and manipulated into position. Upper anchoring rod 152 and lower anchoring rod 160 are then inserted in end walls 14 and 16 to support recutter screen 126. When the forage cutter is initially assembled rotary cutting knives 122 are at their maximum radial extent because at this time, the knives are not worn down or reground. Accordingly, recutter screen 126 must be at its maximum radial extent to properly coact with cutter knives 122.

To accomplish this, annular disks 176 and 178 are positioned so that their high points $a$ are adjacent the top of the recutter screen 126 as shown in FIG. 1. In this position, the effective radius of the segment of abutment edge 184 that can be engaged with recutter screen is the largest effective radius that can be achieved. As used herein, the term "effective radius" of the annular disks 176 and 178 refers to the radius of the segment of the abutment edge in alignment with the recutter screen, and is the average of the radius of the highest point on that segment and the lowest point on that segment. For example, as shown in FIG. 4, segment $c$ of annular disk 176 is aligned with recutter screen 126. The highest point of segment $c$ has a radius $R_3$ and the lowest point has a radius $R_4$. The effective radius of segment $c$ is thus $R_3 + R_4 12$.

Obviously, when the high point $a$ of abutment edge 184 having radius $R_1$ is aligned with the top of recutter screen 126 as shown in FIG. 1, the "effective radius" of abutment edge 184 is at its greatest extent. This radius is then imparted to recutter screen 126 by manipulating adjusting screws 164 to move upper anchoring rod 152. Upper angle bar retainer 138 moves in response to movement of rod 152 to cause recutter screen 126 to fit closely against curved abutment edge 184 of annular disks 176 and 178. The "effective radius" of recutter screen 126 is now at its greatest extent. As used herein, the effective radius of recutter screen 126 is the average of the radius at the upper edge and lower edge of the recutter screen.

As wear occurs on cutting knives 122 or as they are sharpened, it becomes necessary to reduce the radius of recutter screen 126 to correspond to the reduced radial extent of cutting knives 122. To achieve this reduction, the annular disks 176 and 178 are rotated by tool 190 to bring a segment of abutment edge 184 having a smaller effective radius, such as segment $c$ shown in FIG. 4, into alignment with recutter screen 126. Recutter screen 126 is then conformed to the new effecitve radius of abutment edge 184 by adjusting angle bar retainer 138 in slots 154 and 156 by manipulating adjusting screw 164 to draw the recutter screen into engagement with the aligned segment of abutment edge 184 and thereby reduce the effective radius of the recutter screen. The amount of rotation that can be imparted to recutter screen 126 from its high point $a$ is limited by step 186 formed at the junction of the high point and low point.

Recutter screen 126 can thus be easily adjusted to compensate for wear and sharpening of cutting knives 122 without the necessity of a lengthy, time consuming, and expensive disassembly procedure. Further, when one set of the cutting edges of recutter screen 126 becomes dull, the recutter screen can be easily reversed to bring its second set of cutting edges into proper cutting relation with cutting knies 122. All necessary adjustments of the radius of recutter screen 126 can be safely achieved because the operator can make the adjustments on annular disks 176 and 178 and on adjusting screws 164 without having to reach inside the cutter housing.

The invention in its broader aspects is not limited to the specific details shown and described and departures may be made from such details without departing from the principles of the invention and without sacrificing its chief advantages.

What is claimed is:

1. A forage cutter including a housing having an inlet and an outlet, a shaft mounted for rotation in said housing, a rotary cutter mounted on said shaft and having at least one cutting edge, said cutting edge describing a cylindrical cutting path as it rotates about the axis of said shaft, a shapable recutter having an effective radius equal to the radius of said cutting path plus a selected clearance, means for mounting said recutter adjacent to said outlet, means for relocating said recutter in a generally radial direction in order to selectively modify the effective radius of said recutter to conform to a change in the radius of said cutting path.

2. A forage cutter including a housing, a rotary shaft mounted for rotation in said housing, a rotary cutter mounted on said shaft and having a plurality of cutting knives, a shapable recutter screen positioned in coacting shearing relation with the cutting knives, a pair of rotatable annular disks mounted about said shaft and engaged with the recutter screen, said disks having a curved abutment edge of decreasing radius about its circumference for positioning and controlling the radius of the recutter screen.

3. The cutter of claim 2 wherein each of said disks is movable from a first position where a first segment of its abutment edge is engaged with said recutter screen to a second position where a second segment of its abutment edge having a different effective radius than said first segment is engageable with said recutter screen.

4. The cutter of claim 3 including adjusting means for adjusting said recutter screen from its engagement with the first segment of the abutment edge to engagement with said second segment to vary the effective radius of the recutter screen and bring it into proper cutting relation with the cutting knives.

5. The cutter of claim 3 wherein said annular disks each have coupling means for engagement with a tool which operates to rotate said disks from said first position to said second position.

6. The cutter of claim 5 wherein said coupling means comprises a plurality of notches on the outer periphery of said disk.

7. The cutter of claim 6 wherein a retainer is secured to said recutter and has access means for permitting a tool to engage said coupling means.

8. The cutter of claim 6 including a first series of notches that extend from the high point of the abutment edge and a second series of notches that extend from the low point of the abutment edge.

9. The cutter of claim 4 wherein said housing has a pair of end walls and including a pair of bearing cylinders for supporting the ends of said shaft, and wherein each disk is rotatably mounted on one of said cylinders with a friction fit and rotatably clamped between one of said end walls and a flange on one of said cylinders.

10. A forage cutter including a housing having a pair of end walls; a rotary cylinder shaft journaled for rotation in said end walls; a rotary cutter mounted on said shaft and having a plurality of cutting knives; a shapeable recutter screen positioned in coacting shearing relation with the cutting knives; rotatable cam means for positioning and controlling the radius of the recutter screen, said cam means comprising (a) a first annular disk rotatably mounted about said shaft adjacent one of said end walls and having a curved abutment edge of descending radius about its circumference, and (b) a second annular disk rotatably mounted about said shaft adjacent the other of said end walls and having a curved abutment edge of descending radius about its circumference, said disks each having a first segment of their abutment edge engaged with said recutter screen, said first segment of each disk having the same effective radius, and said disks being movable to a position where a second segment of their abutment edge is engaged with the recutter screen, said second segments of each disk having the same effective radius which is different than the effective radius of said first segments; and adjusting means for adjusting the recutter screen from its engagment with said first segments to engagement with said second segments to vary the effective radius of the recutter screen and bring it into proper cutting relation with the cutting knives.

11. A forage cutter as defined in claim 1 within said means for modifying the effective radius of said recutter includes a plurality of cams spaced apart along the axis of said shaft, each of said cams having a curved abutment edge, adjacent sections of said edge having different curvatures, and including means for forcing said recutter into contact with said abutment edges whereby movement of said cams align different sections of the abutment edges with said recutter effecting modification of the effective radius of said recutter.

* * * * *